United States Patent [19]

Faulstich

[11] Patent Number: 4,865,497
[45] Date of Patent: Sep. 12, 1989

[54] METHOD FOR MACHINING THE FLANKS OF GEARS BY SKIVING AND APPARATUS FOR IMPLEMENTING SUCH METHOD

[75] Inventor: Ingo Faulstich, Ludwigsburg, Fed. Rep. of Germany

[73] Assignee: Hermann Pfauter GmbH, Fed. Rep. of Germany

[21] Appl. No.: 908,204

[22] Filed: Sep. 17, 1986

[30] Foreign Application Priority Data

Sep. 17, 1985 [DE] Fed. Rep. of Germany ....... 3533064

[51] Int. Cl.⁴ .............................................. B23F 5/00
[52] U.S. Cl. ......................................... 409/12; 409/60
[58] Field of Search ...................... 409/11, 14, 15, 23, 409/13, 58, 59, 60, 12

[56] References Cited

U.S. PATENT DOCUMENTS

| | | | |
|---|---|---|---|
| 2,282,193 | 5/1942 | Lambrix | 409/60 |
| 2,465,707 | 3/1949 | Braun | 409/58 |
| 3,460,431 | 8/1969 | Birch | 409/58 |
| 4,487,535 | 12/1984 | Johnson et al. | 409/60 |
| 4,514,119 | 4/1985 | Izumo | 409/60 |
| 4,587,766 | 5/1986 | Miyatake et al. | 409/12 |
| 4,708,544 | 11/1987 | Faulstich et al. | 409/12 |

FOREIGN PATENT DOCUMENTS

| | | | |
|---|---|---|---|
| 3048145 | 7/1982 | Fed. Rep. of Germany | 409/11 |
| 51185 | 4/1977 | Japan | 409/11 |
| 134128 | 10/1981 | Japan | 409/12 |
| 149129 | 9/1983 | Japan | 409/11 |
| 81017 | 5/1984 | Japan | 409/15 |
| 666016 | 6/1979 | U.S.S.R. | 409/11 |
| 2042769 | 9/1980 | United Kingdom | 409/11 |
| 8204210 | 12/1982 | World Int. Prop. O. | 409/11 |

*Primary Examiner*—William Briggs
*Attorney, Agent, or Firm*—Foley & Lardner, Schwartz, Jeffery, Schwaab, Mack, Blumenthal & Evans

[57] ABSTRACT

The method is used for machining flanks of unhardened or hardened, spur-toothed or helical-toothed, internally toothed or externally toothed cylindrical gears by skiving. Basic rotation is produced between a tool and a workpiece. In addition, a helical motion between the tool and the workpiece is produced. The relative motion between the tool and the workpiece is executed with high accuracy, and any variations in the relative motion are corrected. The tooth number $z_0$ of the tool, for minimizing the effect of the variations of the tool and its mounting, is fixed in such a way that, in the case of $z_0 \geq z_2$ ($z_2$ is the tooth number of the workpiece, $z_0$ is the tooth number of the skiving tool), the ratio $i = z_0/z_2$, and in the case of $z_0 > z_2$, the reciprocal of the ratio $1/i = z_2/z_0$, result in an integral value or the ratio of two integral numbers, the amount of which is as small as possible.

16 Claims, 5 Drawing Sheets

METHOD FOR MACHINING THE FLANKS OF GEARS BY SKIVING AND APPARATUS FOR IMPLEMENTING SUCH METHOD

BACKGROUND OF THE INVENTION

The invention relates to a method for machining the flanks of gears by skiving, and to apparatus for implementing such method.

For some years, the market has increasingly been demanding methods according to which gears in the hardened condition can be finish machined. This also applies to cylindrical gears which are used in large-scale production, for example, in automobile construction. On one hand, the demand is based on the desire to transmit higher outputs than previously in the case of smaller construction volume of gearing with the lowest possible noise generation, and on the other hand due to the knowledge that the hardening process is still not sufficiently controllable, so that, for example, gears which have had a very high tooth quality before hardening, frequently have inadmissibly high geometrical deviations (errors) after hardening.

The methods used in the past in large-scale production for machining tooth flanks after hardening do not yet meet the requirements of the market. The methods are in particular either too slow and therefore too expensive, or the gearing quality which can be achieved leaves something to be desired.

Based on these findings, a series of new or at least improved methods for machining the flanks of hardened cylindrical gears have been developed in the past several years. Among these methods are skive hobbing with specially designed carbide hobs; grinding with a globoidal grinding worm which is profiled, for example, via a diamond-coated dressing gear; form grinding with a CBN-coated form-grinding wheel by a single indexing method; grinding with a gear-shaped tool which in practice is designated as honing; fine finishing or hard shaving, or grinding with a CBN-coated grinding worm.

Each of these methods still has serious disadvantages for application in mass production. The main criteria for application in mass production are high geometrical quality and superior surface finish; a high rate of metal removal, that is, a high chip removing rate; low machining costs; low tool maintenance requirements, and a simple resetting of the machine. Moreover, it must be possible to machine with the method gears which, apart from the gearing to be machined, have an axially offset collar or a second gearing, sometimes only a small intermediate space being present between the gearing and axially offset collar or the second gearing. It must also be possible to machine internal gearings with the method.

Skiving is known for machining cylindrical gears. This machining method has two main features. On the one hand it permits a high tooth production rate und thus a short machining time; on the other hand, it can only produce gearings in coarse quality. All attempts to produce high quality gearings by skiving have failed. Thus, for example, the production of a machine specifically developed in the United States for the finish machining of unhardened, externally toothed cylindrical gears by skiving has been stopped.

SUMMARY OF THE INVENTION

The object of the invention is to develop a method and apparatus such that there is produced a high gearing quality, a superior surface finish, a high rate of metal removal, low machining costs, and low tool maintenance requirements. Moreover, the method and apparatus are suitable for the preliminary machining of gears, for example, rough machining in the unhardened condition, and for finish machining hardened cylindrical gears in mass production.

With the method according to the invention, cylindrical gears can be manufactured in a high geometrical quality by skiving. The relative motion between the tool and the workpiece is executed with high accuracy. Variations in the relative motion can be minimized or corrected. In this way, it is possible to manufacture cylindrical gears by the skiving method not only with a high tooth production rate but also with a high quality.

With the device according to the invention, the desired high production quality can easily be achieved.

Further features of the invention will be apparent form the following description and drawings.

BRIEF DESCRIPTION OF THE APPLICATION DRAWINGS

The invention is described in greater detail with reference to exemplary embodiments shown in the drawings, in which FIG. 1 is a side view of a skiving machine according to the invention, the skiving head of which is pivoted at an angle to the workpiece axis;

DETAILED DESCRIPTION OF THE PREFERRED EMBODIMENTS

Figure 1:
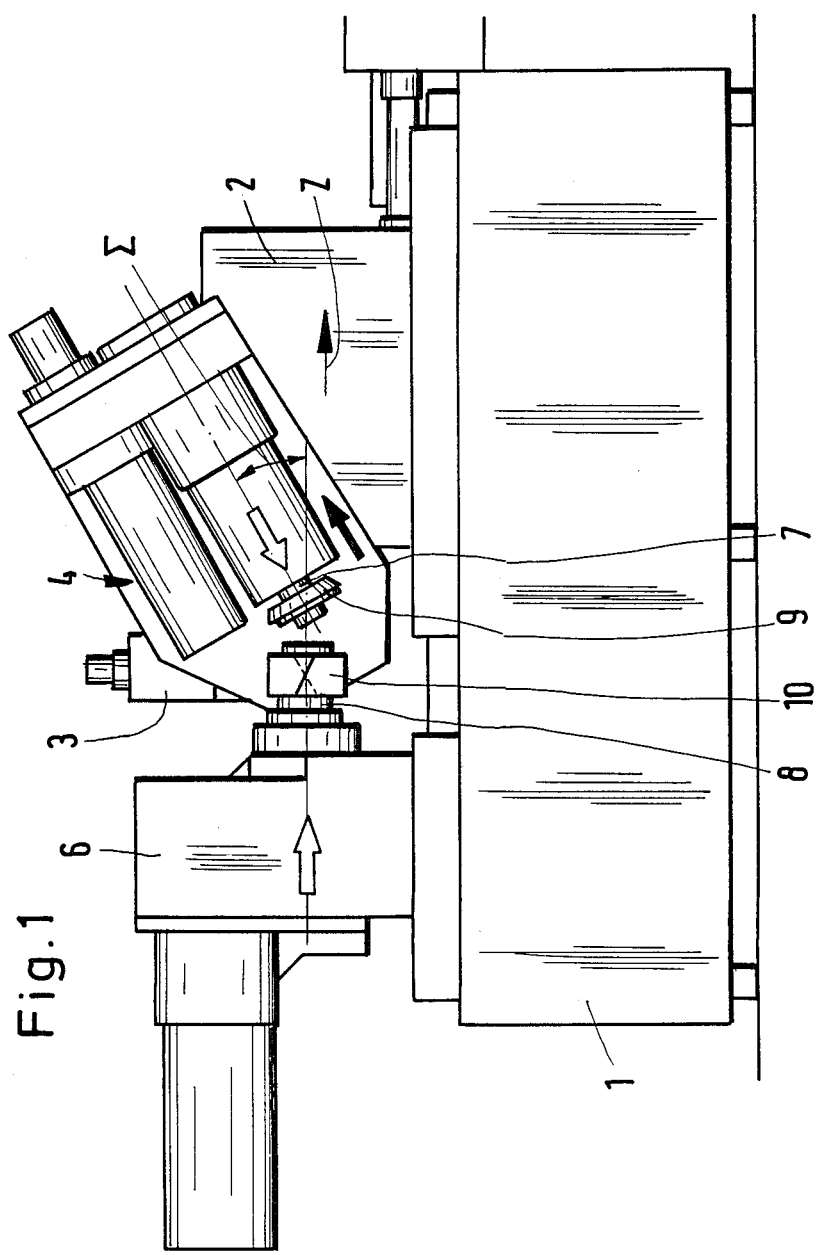
Figure 2:
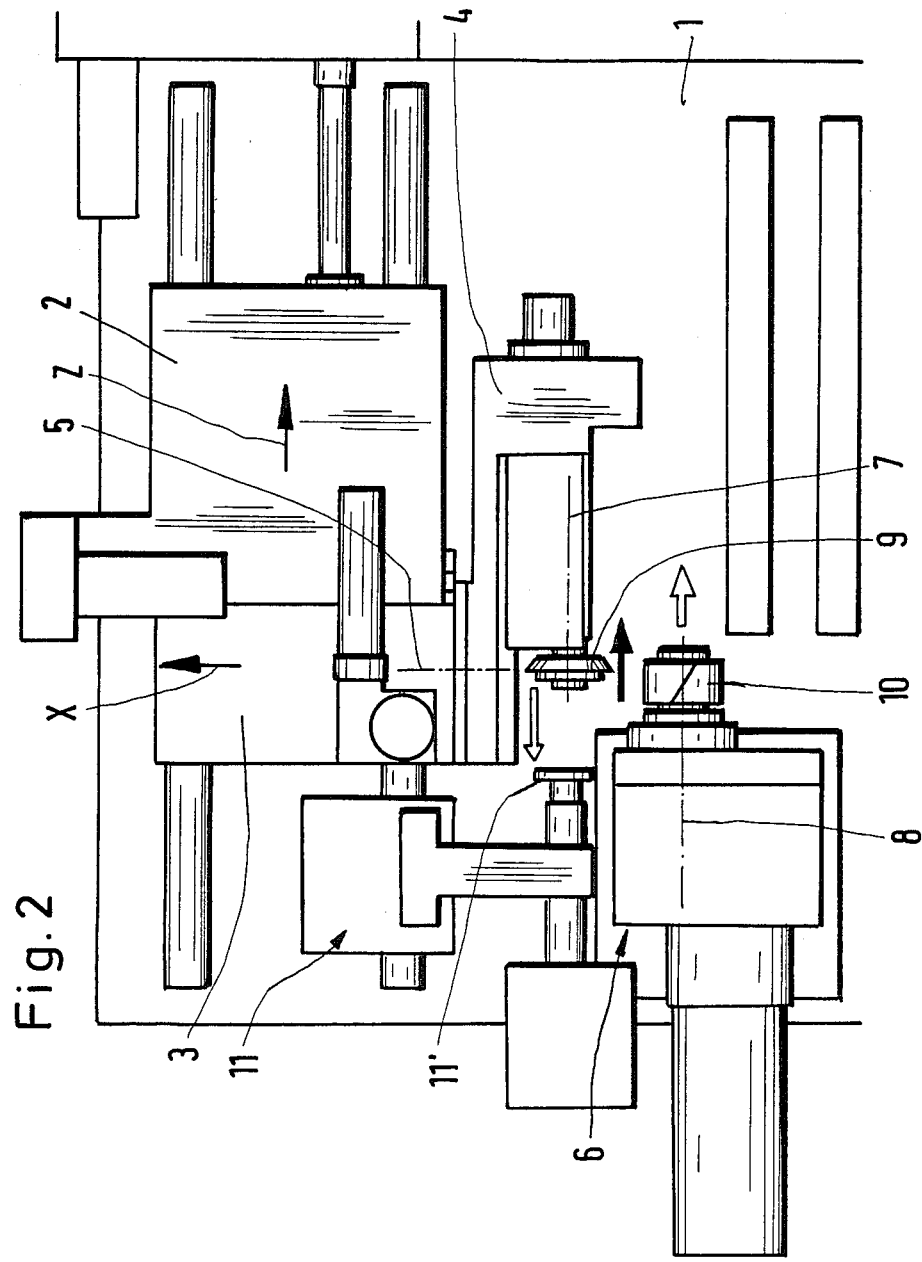
FIG. 2 is a top view of the skiving machine according to FIG. 1, the skiving head of which is pivoted into a horizontal position.
Figure 3:
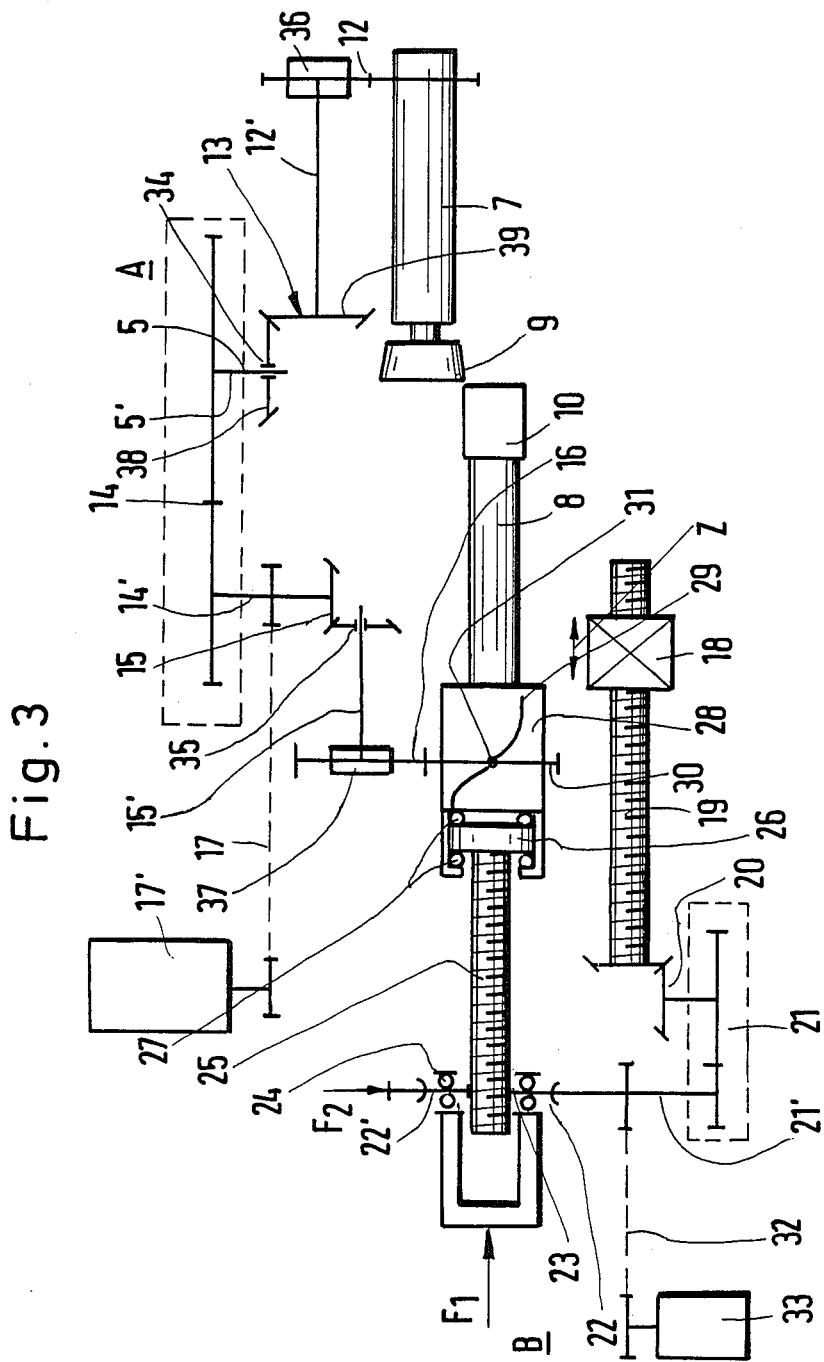
FIG. 3 is a geartrain of the skiving machine.

Referring to embodiment illustrated in FIGS. 1 through 3, the skiving machine has a bed 1 on which an axial slide 2 can be displaced in the direction shown by the "Z" arrow. The slide 2 supports a radial slide 3 which can be displaced relative to the axial slide 2 in the "X" direction (FIG. 2). A skiving head 4 is pivotably arranged on the radial slide 3 about an axis 5, which skiving head 4 can be displaced together with the radial slide in the "X" direction. A workpiece spindle unit 6 is rigidly fixed on the bed 1. The skiving head 4 and the workpiece spindle unit 6 each have a spindle 7 and 8, respectively, for accommodating a tool 9 and a workpiece 10, respectively. On the bed 1 is located a tool-sharpening device 11 having a rotatable sharpening element 11' with which the tool 9 in the skiving machine can be sharpened as required.

During the machining of the workpiece 10, the tool 9 and the workpiece 10 execute a basic rotation in known manner. They rotate in the inverse ratio of their respective tooth numbers. During machining, a narrow strip of the final workpiece tooth flanks develops during one workpiece revolution. A helical motion is required for developing the tooth flanks on the workpiece 10 over the entire width. This is achieved by the axial slide 2 being displaced in the "Z" direction and by the workpiece 10 simultaneously executing a supplementary rotation. During the machining, the axes of the tool 9 and the workpiece 10 are pivoted in known manner relative to one another by the angle Σ (FIG. 1).

FIG. 3 shows a geartrain for producing the basic rotation and the helical motion. The tool 9 is fixed to the tool spindle 7. The latter is in drive connection with an intermediate shaft 12' via a cylindrical gearing 12, which intermediate shaft 12' is connected via a bevel gearing 13 to a shaft 5', the axis 5 of which forms the pivot axis of the skiving head 4. The shaft 5' is part of an index change gearing 14 which has an input shaft 14' which, via a bevel gearing 15, is in drive connection with an intermediate shaft 15'. The latter is in drive connection via a cylindrical gearing 16 with the workpiece spindle 8 and therefore with the workpiece 10. The input shaft 14' is connected via a belt drive 17 to a drive motor 17'. From the latter, the tool 9 and the workpiece 10 are driven in rotating manner about their respective axes via the described gearing, with the tool and the workpiece executing the basic rotation. This described gearing therefore forms a gear train A for producing the basic rotation between the tool 9 and workpiece 10.

A helical gear train B is used for producing the helical motion. It has a spindle nut 18 sitting on a spindle 19, with the spindle nut 18 being connected to axial slide 2. By rotation of the spindle 19, the spindle nut 18 and therefore the axial slide 2 are displaced in the "Z" direction. The spindle 19 is connected via a bevel gearing 20 to helical change gearing 21. The latter has an input shaft 21' which is in drive connection with a threaded spindle 25 via worm gearing 22 and a spindle nut 23. An axial bearing 24 is provided for axially fixing the worm gear 22' which is firmly connected to the spindle nut 23.

On one end, the threaded spindle 25 supports a piston 26 which is mounted via an axial bearing 27 in an helical sleeve 28. The latter is provided with a helical guide 29 into which a driving dog 31 of a cylindrical gear engages. The helical sleeve 28 is connected in non-rotational manner to the workpiece spindle 8 and can be axially displaced on it. A feather key sliding seat, for example, can be used as the non-rotational connection. A motor 33 is used for driving the helical gear train B, which motor 33 is in drive connection with the input shaft 21' of the helical change gearing 21 via a belt drive 32. The motor 33 drives the spindle nut 18 via the gear train B, as a result of which the axial slide 2 connected to the spindle nut is displaced in the "Z" direction.

The helical motion comprises the displacement of the axial slide 2 and the supplementary rotation of the workpiece spindle 8. The supplementary rotation is produced by axial displacement of the piston 26 or the threaded spindle 25. When the piston 26 is axially displaced, the helical sleeve 28 is axially displaced via the axial bearing 27 and at the same time rotated about its axis. This rotation is achieved by the driving dog 31 of the cylindrical gear 30 of the cylindrical gearing 16 engaging into the helical guide 29 of the helical sleeve 28. By rotation of the spindle nut 23, the non-rotationally arranged threaded spindle 25 with the piston 26 and therefore the helical sleeve 28 are axially displaced. As a result of the engagement of the driving dog 31 into the helical guide 29, the helical sleeve 28 is rotated about its axis, in the course of which the tool spindle 8 is also turned, as a result of which the supplementary rotation of the tool spindle is produced. Adaption to the supplementary rotation required for the workpiece to be machined is effected in the helical change gearing 21.

Since the axial slide 2 and the radial slide 3 are displaced in the "Z" direction and in the "X" direction, respectively, sliding guides 34 and 35 are provided for the shafts 5' and 15'.

The gear train A for producing the basic rotation between the tool 9 and the workpiece 10 is preferably developed in such a way that as many elements as possible for this gear train run at the same rotational speed. In the exemplary embodiment, the cylindrical gearing 12 and 16 and the bevel gearing 13 and 15 are in each case made in the ratio 1:1. Within this gear train A, therefore, only two rotational speeds occur, namely the rotational speed of the tool 9 and the rotational speed of the workpiece 10. In such a gearing, the transmission variations of the individual gearings which run at the same rotational speed partly compensate themselves. In those gearing ranges which in each case run equally fast, the transmission variations can be minimized by correcting members 36 and 37. The correcting member 36 minimizes the transmission variations of all elements between the tool 9 and the index change gear on the shaft 5'. The other correcting member 37 compensates for the errors of the elements between the workpiece spindle 8 and the index change gear shaft 14'. Such correcting elements are known per se and can be, for example, double eccentric sleeves which are arranged between the gear and the shaft, and in addition permit the possibility of angular setting of the correction value.

If the skiving head 4 is pivoted about the axis 5, the relative positon of the two bevel gears 38 and 39 of the bevel gearing 13 changes. Consequently, the entire transmission variation of the elements rotating at the tool rotational freqency also changes. This change in the transmission variation can be compensated by a modified setting of the correcting member 36.

Such correcting members can also be provided in the helical gear train B. With these correcting members, the amplitude and the phase of the supplementary motion required for correction can be set for the respective gearing path.

It is of course also possible, before every machining operation in mass production, to measure the transmission variations between the tool 9 or tool spindle 7 and the workpiece 10 or the workpiece spindle 8 and to set the correcting members 36 and 37 on the basis of the measurement result. At the same time, the effects of the change gears in the index change gearing 14 are likewise sensed and largely compensated.

Figure 7:
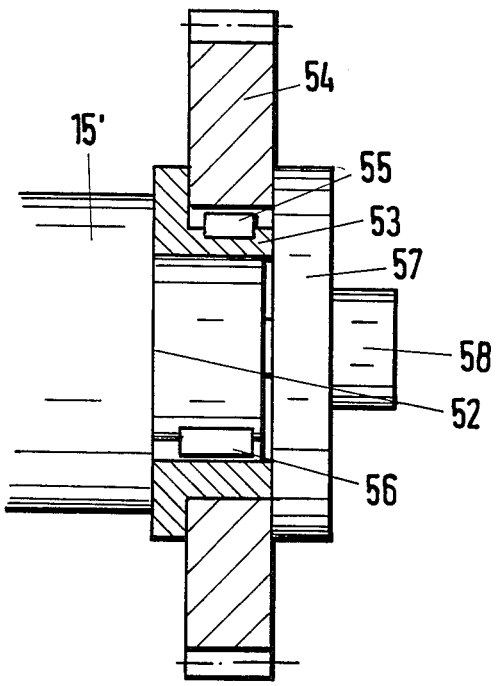
FIG. 7 is an axial section of an error-compensating device of the skiving machine according to the invention.
Figure 8:
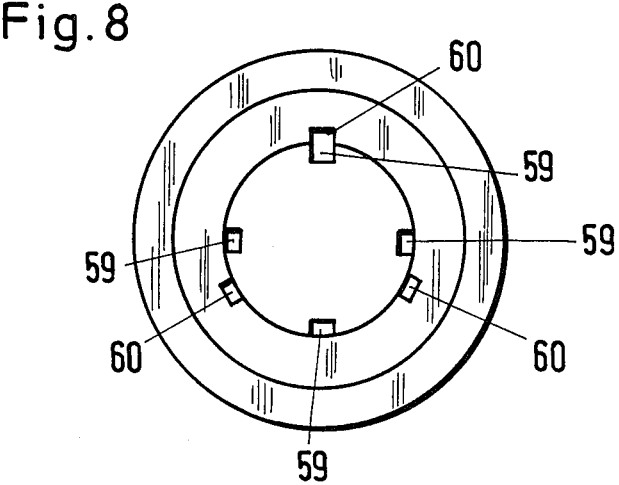
FIG. 8 is an end view of the error-compensating device according to FIG. 7.

An embodiment of the correcting members 36 and 37 is shown in FIGS. 7 and 8. In this device, the shaft 15' has a shaft collar 52. The device itself consists of an eccentric sleeve 53, a gear 54 with eccentric bore, feather keys 55 and 56, grooves 59 and 60 and also the cover 57 and the screw 58.

The mode of operation of the correcting member 36 or 37 is as follows. The eccentric sleeve 53 is connected to the shaft 15' via the feather keys 56 and the grooves 59 and 60. It has an outer locating surface which is eccentrically to the bore. The gear 54 with the eccentric bore is located on this locating surface and the angular position is set by the feather key 55. By turning the gear 54 relative to the eccentric sleeve 53, a resulting amount of eccentricity of the gearing of the gear 54 to the shaft 15' is obtained. The angular position of this resulting eccentricity can be set to the desired value relative to the shaft 15' via an angular positioning of the unit, consisting of the eccentric sleeve 53 and the gear 54. The cover 57 and the screw 58 hold the unit together.

It is generally known that an eccentrically running gearing produces a periodic transmission variation at the rotational frequency of the gear. Therefore if the eccentricity can be set in the desired amplitude and phase relative to a corresponding shaft, a periodic transmission variation has thus been incorporated into the gear train. If the transmission variation is then known at the rotational frequency of this shaft on the basis of a measurement of this gearing, a specific transmission variation can be incorporated into the gear train by setting a defined amount of the resulting eccentricity and the phase of this eccentricity to the shaft, and, if necessary, an existing transmission variation at this frequency can therefore be compensated for.

It is also possible to integrate the system for measuring the transmission variations into the machine and to set the correcting members 36 and 37 automatically.

Moreover, it is possible to take corrective measures in the helical gear train B. Since the displacement of the threaded spindle 25 for producing the supplementary rotation is separate from the displacement of the axial slide 2, the threaded spindle 25 can be displaced by a certain amount in the axial direction via the forces $F_1$ and $F_2$ (FIG. 3). The force $F_1$ acts on the axial bearings 24 of the worm gearing 22 in the axial direction of the threaded spindle 25. The force $F_2$ acts on the axial bearings of the worm (not shown) of the worm gearing 22. These forces bring about a displacement of the threaded spindle 25 in the axial direction via the compliance of the axial bearings 24 of the worm gearing or the axial bearings (not shown) of the worm. The forces $F_1$ and $F_2$ can, for example, be produced hydraulically by using a servo valve or two servo valves. The control signals correspond to the variations to be corrected. It is possible to obtain the signals on-line via an integrated measuring system. It is also possible to store the measuring signals and to control the servo valves in such a way that a phase shift is compensated for on the basis of the system frequency response. By means of axial displacement of the threaded spindle 25, the supplementary motion of the work spindle 8 is produced in the described manner via the helical sleeve 28.

The drive train A for producing the basic rotation between the tool 9 and the workpiece 10 is designed in such a way that variations of as many transmission elements as possible, such as gears and tooth belts, are at least partly mutually neutralized. The remaining variations can be specifically further reduced by the correcting members 36 and 37, so that the transmission variations become minimal. The mechanical gear train B for producing the helical motion is designed in such a way that, with the exception of the workpiece spindle 8 and the tool spindle 9 respectively, none of the elements used for producing the basic rotation is affected in its relative angular position, because the supplementary rotation is introduced into the gear train A directly at the workpiece spindle 8. However, it is also possible to initiate the supplementary rotation at another location of the gear train A. However, this changes the angular position of several elements of the gear train A. In this case, the transmission variations can be kept sufficiently small by technical measures relating to production, control and/or adjustment.

It is also possible to replace one of the two gear trains A and B or even both gear trains completely or partly by electronic linking of the motions.

Moreover, it is possible to compensate for a combination of the mechanical gear trains A and B with an electronic linking of the motions in such a way that the transmission variations between individual elements of the device are measured and a corresponding correction motion is superimposed on the uncorrected motion.

Geometric variations of the tool 9 and/or clamping variations can be at least partly compensated for by superimposing a corresponding correcting motion between the tool 9 and the workpiece 10.

Gearings of high quality can be produced by the skiving method utilizing the skiving machine described. It is possible to use this described method for finish machining hardened cylindrical gears in mass production. Very high quality grades with superior surface finish can be produced with the described method. The rate of metal removal, the so-called chip removing, is optimum, and the machining costs can be kept down. Relatively little maintenance is required for the tool 9. With the skiving method, workpieces 10 can be machined in which there is only a small intermediate space between the gearing and a collar or a second gearing. The method described also offers the possibility of machining internal gearings. Finally, the method is also suitable for the preliminary machining of the gears, that is, for rough machining in the unhardened conditon.

The tool 9, when worn down, can be resharpened in simple manner with the tool-sharpening unit 11 arranged on the bed 1. The tool 9 for producing the high gearing quality is accurately designed, accurately manufactured, and accurately located in the skiving machine.

The tool 9 is made of suitable cutting material, for example carbide. The number of teeth of the tool 9, for minimizing the effect of variations of the tool and its clamping, which variations cannot be avoided even in the case of the greatest technical effort, is fixed within the framework of prescribed limits in such a way that, in the case $z_0 \geq z_2$, the transmission ratio $i = z_0/z_2$ and, in the case of $z_0 \leq z_2$, the reciprocal of the ratio $1/i = z_2/z_0$ result in an integral or whole number value or in a ratio of two integers, the amount of which is as small as possible. In this equation, $z_0$ signifies the tool tooth number and $z_2$ the workpiece tooth number.

With the tool 9 thus developed, the desired high gearing quality and surface finish of the workpiece 10 is achieved in simple manner.

For skiving cylindrical gears, normally tools are used that are limited to the specific workpiece gearing. In designing these tools, the designer must take into account, inter alia, the desired workpiece geometry and a working range of the machine (minimum and maximum tool diameter, minimum and maximum distances between axes, pivot angle and also minimum and maximum rotational speeds of the operating spindles). To avoid interference, tools for machining internal gears must receive a tooth number which is essentially smaller than the workpiece tooth number. A further restriction in the tooth number range available for reasonable tool design results from the demand for a minimum tooth-tip thickness for stability reasons and a minimum tooth-gap width for technical reasons relating to production. Despite these restrictions, a relatively large range normally remains within which the designer can fix the tool tooth number.

The geometrical variations of skived gears depend, inter alia, on the ratio $i = z_0/z_2$ where $z_0$ signifies the tool tooth numer and $z_2$ the workpiece tooth number. Details as to how this ratio and therefore, for a certain machining case, the tool tooth number are to be selected for producing workpieces in high quality are not known. The recommendation given in the literature, in order to guarantee the quality of the gearing (to use tools for machining an internal gearing, the tooth number of which does not go integrally into the workpiece tooth number) does not lead to satisfactory operating results. In this respect, see, for example, "Handbuch Verzahntechnik" ("Manual of Gear Engineering"), Prof. F. Opitz, VEB Verlag Technik, Berlin, 1981, page 161. From these facts follows the task of fixing the tooth number of a skiving tool, limited to the workpiece gearing in such a way that workpieces of high quality can be produced.

For this purpose, it is proposed according to the invention to fix a tool tooth number within the limits outlined above in such a way that an integer value or the ratio of two integers, the amount of which is as small as possible, results for the ratio $i = z_0/z_2$ in the case of a tool tooth number greater than the workpiece tooth number and for the reciprocal of the ratio $1/i = z_2/z_0$ in the case of a tool tooth number smaller than the workpiece tooth number.

In explanation, the conditions during machining of a helical gearing with a spur toothed tool may be considered. Similar conditions result when using helical tools.

If the workpiece has a tooth number $z_2 = 60$, the tool, according to the invention, should receive a tooth number $z_0 = 60$. In this case, the geometrical variations of the skiving cutter are transmitted to the workpiece as follows: the cumulative spacing variation $F_{p2}$ of the workpiece is approximately equal to the cumulative spacing variation $F_{p0}$ of the tool, divided by the cosine of the workpiece helix angle $\beta_2$:

$$F_{p2} \approx F_{p0}/\cos \beta_2$$

The cumulative profile variation $F_{\alpha 2}$ of the workpiece is approximately equal to the cumulative profile variation $F_{\alpha 0}$ of the tool, divided by the cosine of the workpiece helix angle $\beta_2$:

$$F_{\alpha 2} \approx F_{\alpha 0}/\cos \beta_2$$

A helix variation $F_{\beta 2}$ does not arise on account of geometrical variations of the tool:

$$F_{\beta 2} = 0$$

If the geometrical variations of the skiving cutter, for example in the module range between 2 mm and 3.55 mm and also in the diameter range between 125 mm and 280 mm correspond to quality 4 with respect to $F_{p0}$ and $F_0$ according to DIN 3962 (i.e. grade A according to DIN 1829 part 2), $F_p$ and $F_{\alpha 2}$ can be expected to be at least in quality 5.

If the tool tooth number $z_0$ were now changed from 60 to 61, then $i = z_0:z_2 = 61:60$, that is the ratio of two large numbers, compared with the previously considered ratio $i = 1:1$. On the workpiece, apart from the above-mentioned variations, a helix form variation would arise $$f_{\beta 2} \approx F_{p0}/\cos \beta_2$$

This variation is fully superimposed on the above stated profile variation at a correspondingly large workpiece helix angle. An overall profile varitation in quality 8 and a helix form variation likewise in quality 8 would thus be obtained on the workpiece. Under ideal preconditions (machine and workpiece mounting extremely rigid and accurate), the workpiece, at a transmission ratio $i = 1$, with respect to $f_{\beta 2}$, would be in quality 1 according to DIN 3962.

If the tolerances for the helix form variation of the workpiece is compared with the tolerances for the overall spacing variation of the tool, it can be seen that, for producing a workpiece in quality 4 with respect to $f_{\beta 2}$, a tool in quality 1 with respect to $F_{p0}$ would be necessary if the tool has a tooth number $z_0 = 61$. Tools of this type cannot be manufactured at present with justifiable expenditure. Problems of this type do not occur when using tools which correspond to the design according to the invention.

If, for example, $i = 1$ cannot be realized for a tool tooth number on account of the above-mentioned limits, i or 1:i should be represented, according to the invention, as a ratio of other small integers. The following tooth numbers also come into consideration: $z_0 = 120$, 30, 180, 20, 90 and 40. In particular, it is to be noted in this respect that for other integral values of $i = z_0:z_2$, hence, for example, for $z_0 = 120$ (180), the following applies: tool teeth which work in a certain workpiece gap during one workpiece revolution, work in the same gap after $i = 2$ (3) further workpiece revolutions. If it is considered that feeds from 0.1 mm up to 0.2 mm per workpiece revolution are used for skiving, it is evident that, as a result of overlaps in the flank direction, practically no flank-line form variations can likewise develop on the workpiece on account of cumulative spacing variations of the tool. At the same time, the workpiece surface simply receives a pattern as developed unter ideal geometric conditions or when using a tool with $z_0 = 60$ if at the same time work is carried out with a feed increased by the factor $i = 2$ (3). In addition, the above-mentioned overlaps lead to a reduction in the cumulative spacing variation on the workpiece.

For integer values of $1/i = z_2:z_0$, hence for $z_0 = 30$ (20), the following applies: each tooth of the tool works in 2 (3) gaps of the workpiece gearing. But the same tool tooth always works in one workpiece tooth gap.

In this case, the cumulative spacing variation of the tool likewise cannot develop as a helix form variation on the workpiece. As cumulative spacing variation, a course with 2 (3) periods develops on the workpiece circumference.

If an integer value does not result for i or 1/i but a ratio of two other small integers numbers, hence, for example, $i = 3:2$ ($1:i = 3:2$), $z_0 = 90$ (40) is obtained For this example the following applies: after 2 (3) tool revolutions and 3 (2) workpiece revolutions, all tool teeth work again in the workpiece tooth gap in which they have worked before this rotation. The cumulative spacing variation of the tool does not take effect as a helix form variation; a flank pattern again develops as if the machining had been carried out under ideal conditions with increased axial feed.

If it is considered that clamping variations of the tool and components of the transmission variation in the rotation between the tool and the workpiece, at the rotational frequency of the tool spindle, are transmitted to the workpiece like the cumulative spacing variation, it is evident that the interrelations described above are of the greatest practical importance. If unfavorable ratios are realized in the tool design, gears of coarse quality are obtained even when using tools having extremely tight tolerances.

Conditions are given according to which the tooth number can be fixed for tools, limited to the workpiece, in such a way that workpieces of high geometrical quality can be produced at "normal quality" (grade) of the tool.

Figure 4:
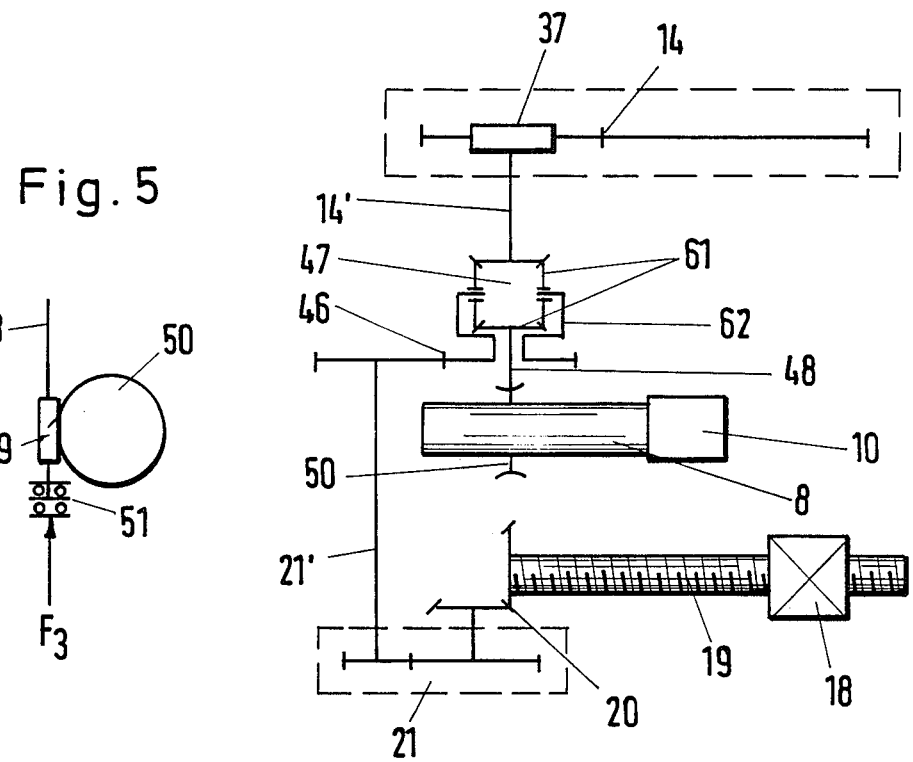
FIG. 4 is a partial showing of a second embodiment of a skiving machine according to the invention, in which the supplementary rotation is initiated via differential gearing.
Figure 5:
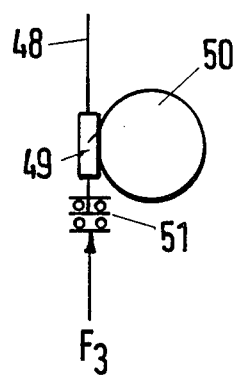
FIG. 5 is a schematic presentation in partial side view of the drive of the workpiece spindle of the skiving machine according to FIG. 4.

In the embodiment shown diagrammatically in FIGS. 4 and 5, the supplementary rotation of the workpiece spindle 8 is initiated via differential gearing 47. In this embodiment, the correcting member 37 is arranged on the shaft 14'. The differential gearing 47 is located between the shaft 14' and a worm shaft 48. In this case, the workpiece spindle 8 is driven via the worm 49 and the worm gear 50 (FIG. 5). The input shaft 21' is in drive connection with deferential gearing 47 via the cylindrical gearing 46. In this case, the basic rotation between the tool spindle 7 and the workpiece spindle 8 runs via the shaft 14, the bevel gears 61 of the differential gearing 47, the worm shaft 48 and the worm gear 50 to the workpiece spindle 8.

The supplementary rotation runs via the shaft 21', the cylindrical gearing 46 to the cage 62 of the differential gearing 47 and from there via the bevel gears 61 to the worm shaft 48.

The transmission variations between the differential gearing 47 and the workpiece spindle 8 can be compensated via a displacement of the worm 49 in the direction of its axis, produced via the force $F_3$ (FIG. 5). The force $F_3$ acts on the axial bearing 51 of the worm 49, producing the desired correction motion on account of compliance of the bearing.

Figure 6:
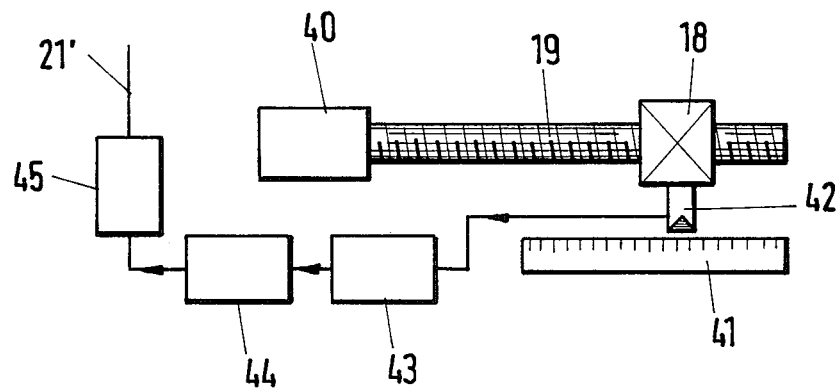
FIG. 6 is a partial showing in schematic presentation of a part of a third embodiment of a skiving machine according to the invention, in which the relative motions between the tool spindle und the workpiece spindle are partly electronically linked.

In the embodiment according to FIG. 6, the helical motion is achieved by individual motion components which are electronically linked. For this purpose, the machine includes a scale 41, a scanning head 42 by means of which the axial slide position is detected, a controller 43 in which the measuring signals are received and processed while taking into account the desired transmission ratio between the axial slide displacement and the supplementary rotation, an amplifier 44 and a motor 45. The motor 45 drives the shaft 21' previously mentioned. In this embodiment, the axial slide 2 is driven via the motor 40 and the threaded spindle 19 having the spindle nut 18 (see FIG. 3). When using the electronic linking shown in FIG. 6, the transmission variations can be kept sufficiently small.

What is claimed is:

1. A method of machining a workpiece by a tool by skivins, with said workpieces comprising flanks of cylindrical gears which can be hardened or unhardened, square or helical-toothed, and externally or internally-toothed, comprising the steps of:

(a) mounting said workpiece on a supporting means for rotation about the axis of said supporting means;

(b) mounting said tool on a tool supporting means for rotation about the axis of said tool supporting means;

(c) positioning and arranging said workpiece supporting means and said tool supporting means so that said axis are in planes which intersect each other during the process of machining the workpiece;

(d) producing through a series of gears a basic rotation of said tool and said workpiece about their respective axes;

(e) producing a relative helical motion between said tool and workpiece to obtain the desired gear depth in the workpiece;

(f) correcting during the machining process variations in the relative motion transmitted between said workpiece and said tool;

(g) wherein, where $z_0$ is the tool tooth number and $z_2$ the workpiece tooth number, the tool tooth number $z_0$, in order to minimize the effect of the variations of the tool and its mounting, is designed in such a way that, in the case of $z_0 \geq z_2$, the transmission ratio $i = z_0/z_2$ and, in the case of $z_0 \leq z_2$, the reciprocal of the transmission ratio $1/i = z_2 z_0$ result in an integer or a ratio of two small integers, respectively.

2. The method as claimed in claim 1, in which a first gear train comprised of said series of gears is provided for producing the basic rotation between the tool and the workpiece, the number, shape, and arrangement of the series of gears of said first gear train being such that certain transmission variations are accommodated without correction.

3. The method as claimed in claim 2, wherein remaining transmission variations ar reduced by a correcting member forming part of said first gear train.

4. The method as claimed in claim 1, in which a second gear train comprised of a series of gears is used for producing the helical motion, and wherein only the relative angular position of spindles carrying said workpiece and said tool are affected by the basic rotation between said tool and said workpiece.

5. The method as claimed in claim 1, in which a second gear train comprised of a series of gears is used for producing said helical motion, and modifying in said second gear train several of the elements required for producing the basic rotation between said workpiece and said tool.

6. The method as claimed in claim 1, wherein said helical motion between the tool and the workpiece is effected at least partly by electronic linking which takes into account the transmission variables effecting rotation and helical motion.

7. The method as claimed in claim 1, further including the step of measuring the uncorrected transmission variations between individual elements in the rotation and helical motion process, and providing a corresponding correcting motion superimposed on the uncorrected variations.

8. The method as claimed in claim 1, wherein the geometric variations of the tool and workpiece are at least partly compensated by superimposing a corresponding correcting motion between the tool and the workpiece.

9. Apparatus for machining a workpiece by skiving wherein the workpiece comprises flanks of cylindrical gears, comprising:
   (a) a machine bed;
   (b) an axial slide member mounted on said bed for movement in an axial direction relative to the workpiece to be machined;
   (c) a tool spindle mounted on said axial slide member, and a tool carried by said spindle for rotation about the axis of said spindle;
   (d) a workpiece spindle mounted on said bed, said workpiece carried by said spindle for rotation about the axis of said spindle;
   (e) the axes of said spindles being arranged skewed during the machining of the workpiece;
   (f) means for rotating said tool and workpiece;
   (g) means for producing a helical motion in one of said tool and workpiece to develop gearing of the desired width in said workpiece;
   (h) means for correcting transmission variations occurring in the relative motion between said workpiece and said tool, and
   (i) wherein, where $z_0$ is the tool tooth number and $z_2$ the workpiece tooth number, the tool tooth number $z_0$, in order to minimize the effect of the variations of the tool and its mounting, is fixed in such a way that, in the case of $z_2 ] z_0 \geq z_2$, the transmission ratio $i = z_0/z_2$ and, in the case of $z_0 \leq z_2$, the reciprocal of the transmission ratio $1/i = z_2/z_0$ result in an integer or a ratio of two integers, respectively.

10. Apparatus as claimed in claim 9, further including a first gear train including at least one gear and shaft for producing the basic rotation between the tool and the workpiece, and wherein said correcting means for reducing the transmission variations is arranged in the first gear train.

11. Apparatus as claimed in claim 10, wherein said correcting means comprises an eccentric sleeve between such gear and shaft, said eccentric sleeve producing a sinusoidally running correcting motion set according to amount and phase.

12. Apparatus as claimed in claim 10, wherein said first gear train includes a plurality of gear steps, certain of which have a transmission ratio of 1:1.

13. Apparatus as claimed in claim 10, wherein, at $i = z_0 : z_2 = 1$, all gearing steps between the tool and the workpiece have the ratio 1:1.

14. Apparatus as claimed in claim 9, further including a second gear train for producing helical motion in said workpiece spindle, and wherein said correcting means comprises a correcting member positioned in said second gear train for reducing transmission variations in said second gear train.

15. Apparatus as claimed in claim 9, further including detection and linking means for detecting the position of said slide member, and drive means operatively connected to said detection and linking means for driving said slide member.

16. Apparatus as claimed in claim 9, further including a sharpening device mounted on said bed for sharpening said tool.

* * * * *